United States Patent
Mazzarella et al.

(10) Patent No.: US 11,425,333 B2
(45) Date of Patent: *Aug. 23, 2022

(54) VIDEO MANAGEMENT SYSTEM (VMS) WITH EMBEDDED PUSH TO TALK (PTT) CONTROL

(71) Applicant: Mutualink, Inc., Wallingford, CT (US)

(72) Inventors: Joseph R. Mazzarella, Tolland, CT (US); Michael S. Wengrovitz, Concord, MA (US); Mark Hatten, Farmington, CT (US)

(73) Assignee: Mutualink, Inc., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,343

(22) Filed: Dec. 28, 2020

(65) Prior Publication Data

US 2021/0195140 A1 Jun. 24, 2021

Related U.S. Application Data

(63) Continuation of application No. 16/125,569, filed on Sep. 7, 2018, now Pat. No. 10,880,517, which is a
(Continued)

(51) Int. Cl.
*H04N 7/14* (2006.01)
*H04W 4/90* (2018.01)
(Continued)

(52) U.S. Cl.
CPC ......... *H04N 7/147* (2013.01); *H04L 65/4061* (2013.01); *H04L 65/4069* (2013.01);
(Continued)

(58) Field of Classification Search
CPC ......... H04W 4/029; H04W 4/90; H04W 4/08; H04W 4/10; H04W 4/14; H04L 65/4061;
(Continued)

(56) References Cited

U.S. PATENT DOCUMENTS 8,581,957 B2 * 11/2013 Bengtsson ....... H04N 21/41407
709/204
9,313,556 B1 * 4/2016 Borel ................. H04N 21/4223
(Continued)

OTHER PUBLICATIONS

Office Action directed to related European Patent Application No. 16788289.3, dated Feb. 7, 2019; 11 pages.
(Continued)

*Primary Examiner* — Maria El-Zoobi
(74) *Attorney, Agent, or Firm* — Sterne, Kessler, Goldstein & Fox P.L.L.C.

(57) ABSTRACT

Embodiments include a system, method, and computer program product that enable video management of a plurality of video feeds with Push to Talk (PTT) communications. Some embodiments monitor a plurality of video feeds using a VMS graphics user interface (GUI) where a plurality of video feeds are video feed components of an interactive multimedia media object (IMMO) displayed in the VMS GUI. Some embodiments include receiving a selection of a first talk group that is associated with the IMMO, where members of the first talk group may view the video feed components and communicate via PTT. Subsequently, some embodiments include receiving a second selection of a second talk group, associating the second talk group with the IMMO, and enabling PTT communications among members of the second talk group and an operator of the VMS.

21 Claims, 8 Drawing Sheets

Related U.S. Application Data continuation of application No. 15/725,953, filed on Oct. 5, 2017, now Pat. No. 10,075,674, which is a continuation of application No. 14/875,260, filed on Oct. 5, 2015, now Pat. No. 9,787,940.

(51) Int. Cl.

| | | |
|---|---|---|
| *H04W 4/029* | (2018.01) | |
| *H04L 67/52* | (2022.01) | |
| *H04W 4/10* | (2009.01) | |
| *H04W 4/14* | (2009.01) | |
| *H04L 65/4061* | (2022.01) | |
| *H04L 65/61* | (2022.01) | |
| *H04W 4/08* | (2009.01) | |

(52) U.S. Cl.
CPC ............. *H04L 67/18* (2013.01); *H04W 4/029* (2018.02); *H04W 4/08* (2013.01); *H04W 4/10* (2013.01); *H04W 4/14* (2013.01); *H04W 4/90* (2018.02)

(58) Field of Classification Search
CPC ..... H04L 65/4069; H04L 67/18; H04N 7/147; H04N 7/141; H04N 7/148
USPC ................ 709/204, 223; 455/519, 518, 564; 348/14.02–14.09
See application file for complete search history.

(56) References Cited

U.S. PATENT DOCUMENTS

| | | | |
|---|---|---|---|
| 9,787,940 B2 | 10/2017 | Mazzarella et al. | |
| 10,075,674 B2 | 9/2018 | Mazzarella et al. | |
| 10,880,517 B2 | 12/2020 | Mazzarella et al. | |
| 2005/0143135 A1* | 6/2005 | Brems ................. | H04M 1/2745 455/566 |
| 2006/0121924 A1 | 6/2006 | Rengaraju et al. | |
| 2007/0054686 A1* | 3/2007 | Allen ................... | H04W 76/45 455/518 |
| 2007/0239824 A1* | 10/2007 | Shaffer ............. | H04L 29/06027 709/204 |
| 2008/0108339 A1 | 5/2008 | Shaffer et al. | |
| 2010/0033580 A1 | 2/2010 | Shaffer et al. | |
| 2010/0159976 A1 | 6/2010 | Marocchi et al. | |
| 2011/0143651 A1* | 6/2011 | Marocchi ........... | H04L 65/1076 455/3.06 |
| 2011/0154446 A1* | 6/2011 | Drozt ................... | H04W 76/45 726/4 |
| 2011/0225238 A1 | 9/2011 | Shaffer et al. | |
| 2012/0265867 A1* | 10/2012 | Boucher ............... | H04W 28/16 709/223 |
| 2012/0313755 A1* | 12/2012 | Gutierrez ......... | G08B 13/19682 340/8.1 |
| 2013/0283330 A1 | 10/2013 | Hengeveld | |
| 2014/0187280 A1* | 7/2014 | Bekiares ................. | H04W 4/08 455/519 |
| 2014/0368601 A1* | 12/2014 | deCharms ............... | H04L 67/26 348/14.02 |
| 2016/0219628 A1* | 7/2016 | Sharma ................. | H04W 4/021 |
| 2016/0227084 A1 | 8/2016 | Imamura et al. | |
| 2016/0227384 A1* | 8/2016 | Mazzarella ............. | H04W 4/10 |
| 2017/0099455 A1 | 4/2017 | Mazzarella et al. | |
| 2018/0035078 A1 | 2/2018 | Mazzarella et al. | |
| 2019/0007650 A1 | 1/2019 | Mazzarella et al. | |

OTHER PUBLICATIONS

Office Action directed to related European Patent Application No. 16788289.3, dated Nov. 7, 2019; 10 pages.

International Search Report and Written Opinion for PCT Application No. PCT/US2016/055544, filed Oct. 5, 2016, 13 pages, dated Jan. 18, 2017.

International Report on Patentability for PCT Application No. PCT/US2016/055544, filed Oct. 5, 2016, 8 pages, dated Apr. 10, 2018.

Office Action directed to related Australian Patent Application No. 2016333974, dated Feb. 28, 2020; 3 pages.

* cited by examiner

VIDEO MANAGEMENT SYSTEM (VMS) WITH EMBEDDED PUSH TO TALK (PTT) CONTROL

CROSS-REFERENCE TO RELATED APPLICATIONS

This application is a continuation of U.S. application Ser. No. 16/125,569, filed Sep. 7, 2018, entitled Video Management with Push To Talk (PTT), which is a continuation of U.S. application Ser. No. 15/725,953, filed Oct. 5, 2017, entitled Video Management Enabling Voice Communication Groups, which is a continuation of U.S. application Ser. No. 14/875,260, filed Oct. 5, 2015, entitled Video Management Defined Embedded Voice Communication Groups, which are incorporated herein by reference in their entireties.

BACKGROUND

Field

The embodiments generally relate to providing a video management software (VMS) system with push to talk (PTT) services in association with video management for members of a voice communication group.

Background

Presently, a plethora of disparate communications resources exist including resources using private wireless communications (e.g., public safety and first responder communications networks), public switched network communications resources, public wireless networks, networks of video surveillance devices, private security networks, and the like. For example, prior art video management software (VMS) systems typically enable a control operator to monitor one or more video streams provided by networked video surveillance cameras via a VMS graphical user interface (GUI). But in such systems the control operator may need to utilize multiple separate communication resources including, for example, a Push to Talk (PTT) voice communication system to communicate with field users and first responders information obtained from the monitored video streams of the VMS system.

A typical PTT voice communication system, such as a mobile radio system, enables users to exchange voice communications with each other within defined talk groups or designated radio channels. A PTT talk group is a logically defined voice communications group defined by a PTT user or PTT operator that allows users to send and receive voice messages from other member users in the talk group. The PTT voice communication system is often used by security, public safety and other private user groups to facilitate voice communications within a radio network's coverage area.

Conventional PTT systems also support half-duplex communication methods, e.g., a two-way radio, where only one member of a talk group can transmit and speak at a time, and the remaining members listen. When the transmit channel is released, other members may push to talk (e.g., key a radio) and seize control of the transmitting function until the transmit function is released. The transmit control function may be accomplished through control signaling which blocks other PPT users from acquiring control of the shared transmit function, or may be accomplished through other means such a voice activated detection (VAD) coupled with in-band or out of band control signaling which blocks transmission by other users while a voice communication is being transmitted.

Internet protocol systems using Voice over IP (VOIP) and other digital voice transmission over data network technologies enable client software operated on computing devices such as mobile smartphones to simulate PTT type functionality among a group of users. This IP based PTT technology enables users with a defined talk group to transmit and receive voice communications on a persistent basis subject to a user's PTT application client being actively run and being in active state such as being in the application foreground of an operating system. IP PTT may employ half duplex or full duplex communications, and may impose floor control using means similar to radio-based PTT systems. In either radio or IP based PTT systems, a central operator function serves to register and administer members of a talk group and a talk group is typically limited to enterprise use (members within the same agency or enterprise) or user-defined where an authorized user may establish a talk group and invite members via the central operator.
Disparate Push to Talk (PTT) Services When a control operator detects or becomes aware of an event of interest, e.g., suspicious activity or an emergency situation, in a video feed that the control operator is monitoring, voice communication to field personnel is often required to respond to the object or event of interest. For example, the control operator may be in a security monitoring room operating a VMS application to monitor multiple surveillance cameras distributed across a parking lot. Upon observing within a video feed a potential crime, such as a carjacking attempt, the control operator may need to communicate with a security guard in physical proximity to the surveillance camera providing the video feed.

Typically, the control operator may further need to use a separate radio communication system to communicate with radio users, including the security guard, operating on the same channel or within the same talk group. Alternatively, the control operator may communicate via a telephone or mobile telephone call to a prescribed call number of the security guard. While operating disparate communication resources in this scenario may be possible, albeit inefficient, in the case where multiple events are observed concurrently across different video feeds, managing real-time communication with one or more talk groups in relation to the appropriate video feed becomes exceedingly cumbersome and unmanageable. Furthermore, even in the case of one observed event, the security guard may not be in proximity to the observed event and the control operator should have been communicating with another field personnel in closer proximity to reduce the response time in addressing the event of interest.
Inflexible Video Management Software (VMS) Systems Traditional VMS systems provide monitoring of video cameras that are fixedly coupled to call box functions or intercom systems as in the case of video entry camera monitoring system. In this example, a visitor can initiate an audible notification which is sent to a control operator. The visitor can be seen by the operator, who can communicate with the observed visitor through an intercom box with a speaker and microphone. At most, recent adaptions of VMS systems use internet protocol (IP) networks to enable two-way voice communications between a video camera with speaker and microphone (whether embedded or separately coupled) and the operator using a VMS GUI control at a control station monitoring console.

In the current VMS systems noted above, the voice communication channel or system enables a one-to-one communications modality between the video monitoring camera and the communicating intercom device associated with the video camera. But the control operator observing an event of interest within a video feed often requires communication with multiple field personnel from one or more agencies. Moreover, the intercom device providing voice communications associated with the video feed is fixed either in being physically proximate to the video camera or physically coupled to or part of the video camera device. Therefore, field personnel must be physically proximate to the video camera to communicate with the control operator.

Furthermore, in an emergency situation where multiple events are observed concurrently across a plurality of video feeds, the operators may need to minimize the set up time required to communicate with talk group members proximate to one or more of the events. Additionally, the control operator may best address the emergency situation by directing field personnel and first responders to an event viewed from a video feed based on a field personnel's specific skill-set, expertise, and/or knowledge of how a specific type of equipment operates. Determining and identifying the requisite personnel having the necessary skills and/or equipment, however, can be time consuming and require the operator to relay multiple complex communication with and between various agencies.

In addition, disaster areas often have various levels of restricted or limited access areas for personnel, due to environmental hazards or for facilitating ease of movement of personnel and equipment or the performance of certain unimpeded operational tasks. Communicating restricted access information, including the description of geographic boundaries, communicating access credential levels, and interrogating the validity of access credentials with respect to various personnel can add another layer of complexity for the control operator in identifying the appropriate members of a talk group to communicate with in addressing an emergency situation observed across one or more video feeds of the VMS GUI.

Embodiments address, among other things, the problem that conventional VMS systems are disparate from PTT services or otherwise provide fixed and limited coupling to PTT services. Therefore, a control operator monitoring video feeds within a VMS GUI may need to separately identify appropriate PTT talk groups in relation to a specific video feed and independently operate a separate communication resource, e.g., a PTT communication system. In other examples, field members may need to be physically proximate to voice communication devices coupled to the video cameras on site. In addition, conventional PTT services do not consider geographic boundaries.

BRIEF SUMMARY OF THE INVENTION

What is needed is a system, method, and computer program product that embeds push to talk (PTT) functionality within a video management software (VMS) system such that disparate voice and video communication resources are integrated. In an embodiment, a VMS graphics user interface (GUI) provides the capability to monitor a plurality of video feeds provided by corresponding video cameras. Each of the video feeds may be a video feed component of a corresponding interactive multimedia object (IMMO) that is displayed in the VMS GUI. One or more video feeds displayed within the VMS GUI may be coupled to an embedded PTT control component. A defined talk group may be logically associated with the one or more video feeds by coupling the talk group to the embedded PTT control component. Upon detecting that the PTT control component is activated by an operator, the VMS system may enable PTT voice communications related to the one or more video feed views between the operator and each member comprising the defined talk group. In an embodiment, the talk group may be selected from a predefined talk group or a dynamically created group.

In an embodiment, the VMS system may determine a geolocation of each video camera providing a corresponding video feed of an IMMO. Based on determined geolocations, a plurality of IMMOs may be displayed on a map interface within the VMS GUI such that each IMMO is positioned on the map to correlate with the determined geolocation. The IMMO may include multiple components to integrate different communication resources including voice and video communications.

Further embodiments, features, and advantages, as well as the structure and operation of the various embodiments, are described in detail below with reference to accompanying drawings. It is noted that the embodiments are presented herein for illustrative purpose only. Additional embodiments will be apparent to persons skilled in the relevant art(s) based on the teachings contained herein.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention.

Figure 4C:
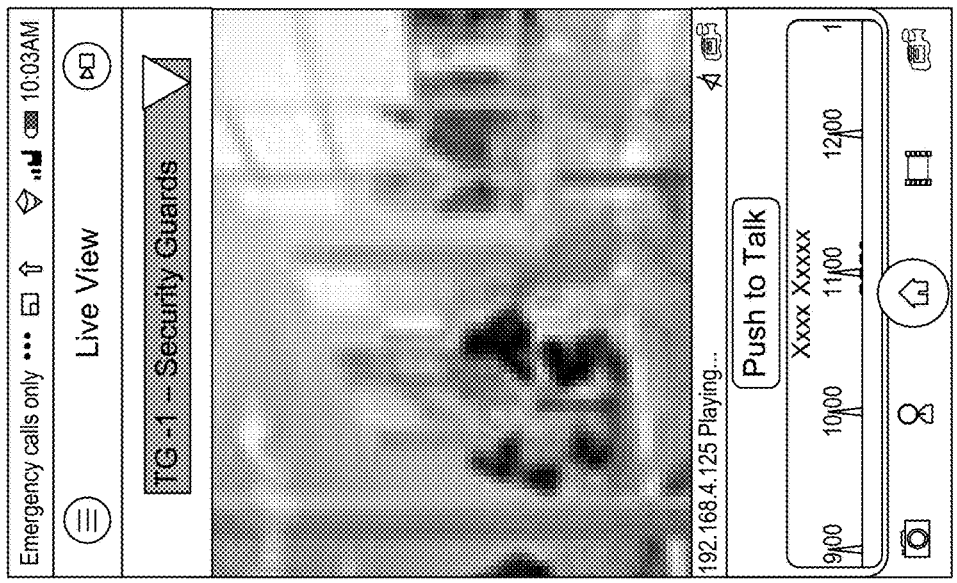
Figure 4B:
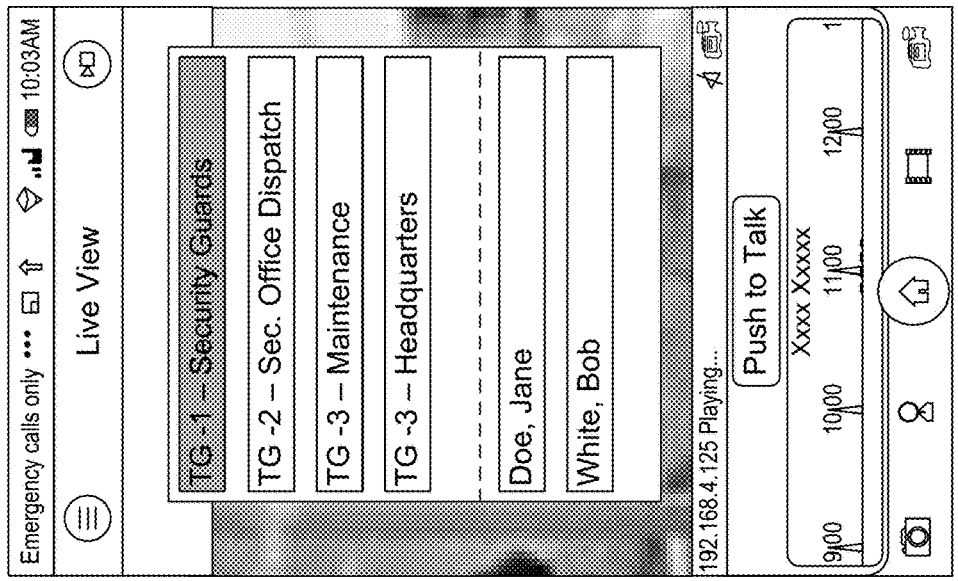
Figure 4A:
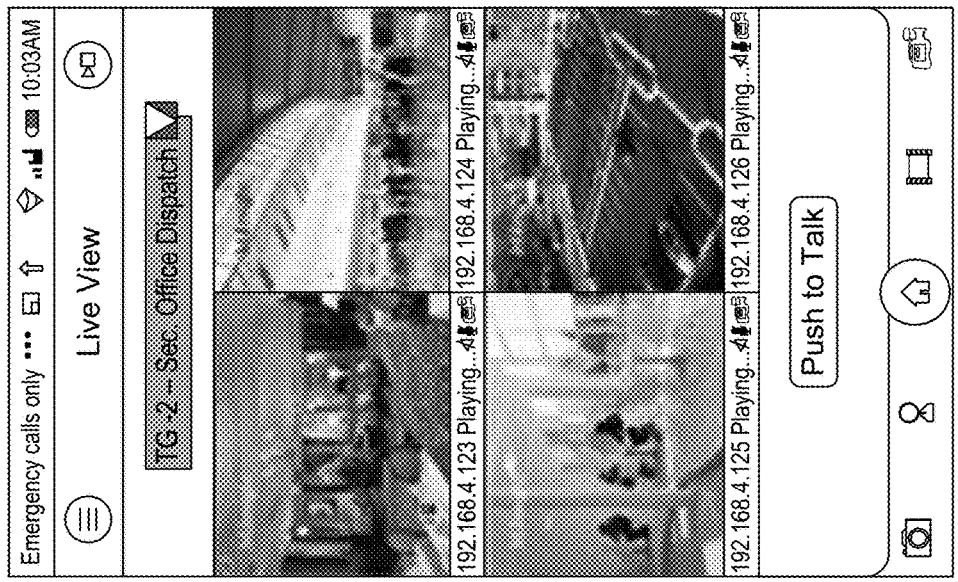

FIGS. 4A-C are diagrams of multiple VMS GUI views, according to an example embodiment.

Figure 5:
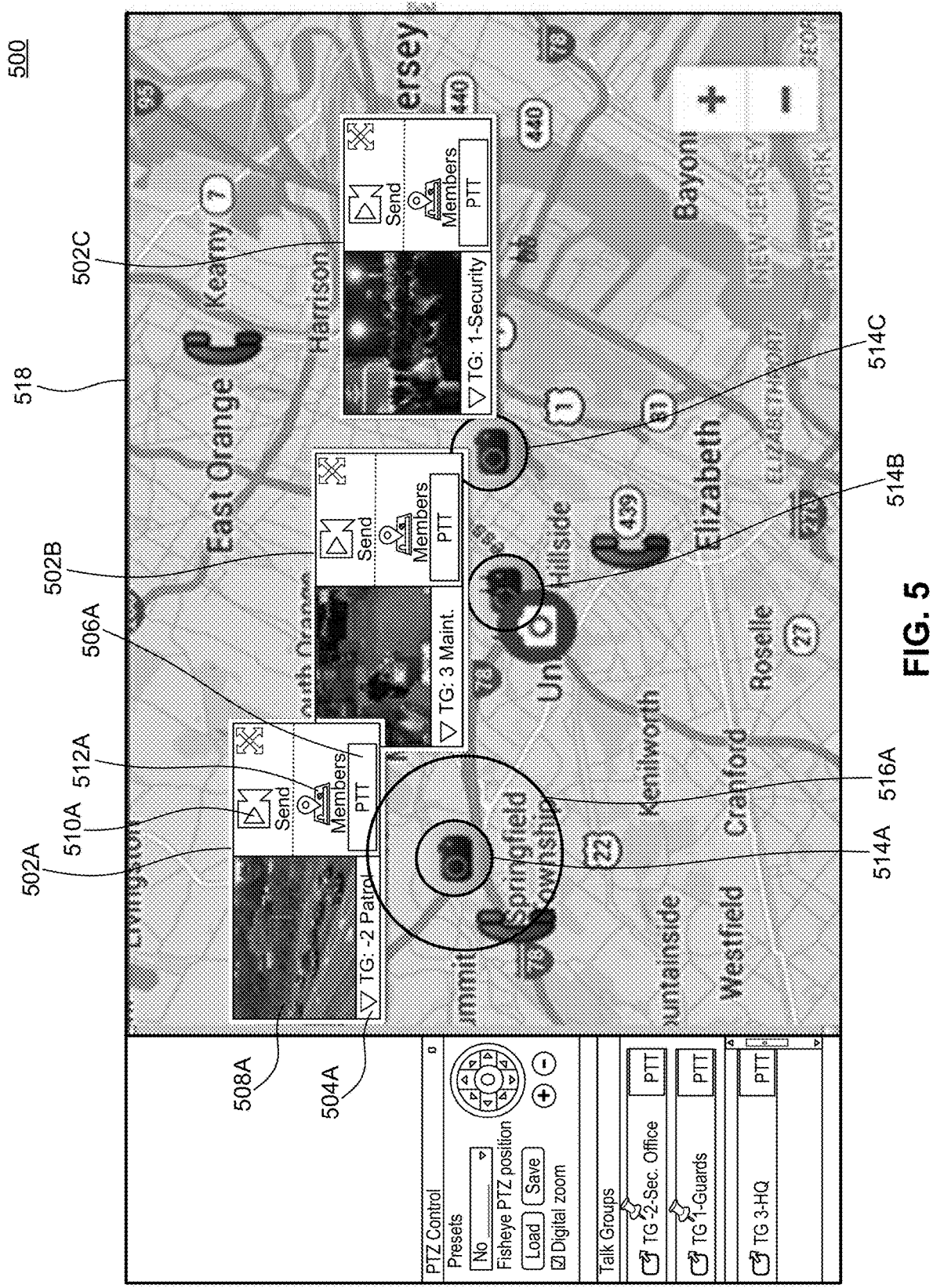

FIG. 5 is a diagram of a VMS GUI view including a map interface, according to an example embodiment.

Figure 6:
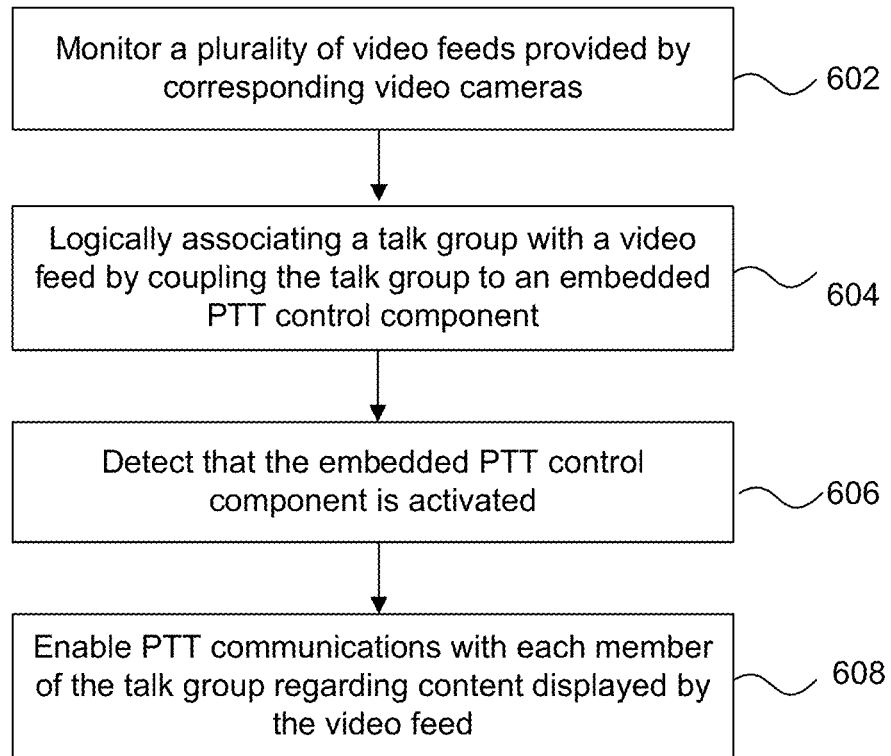

FIG. 6 is a flow chart of a method for enabling PTT communications in a VMS system using embedded PTT controls, according to an example embodiment.

Figure 7:
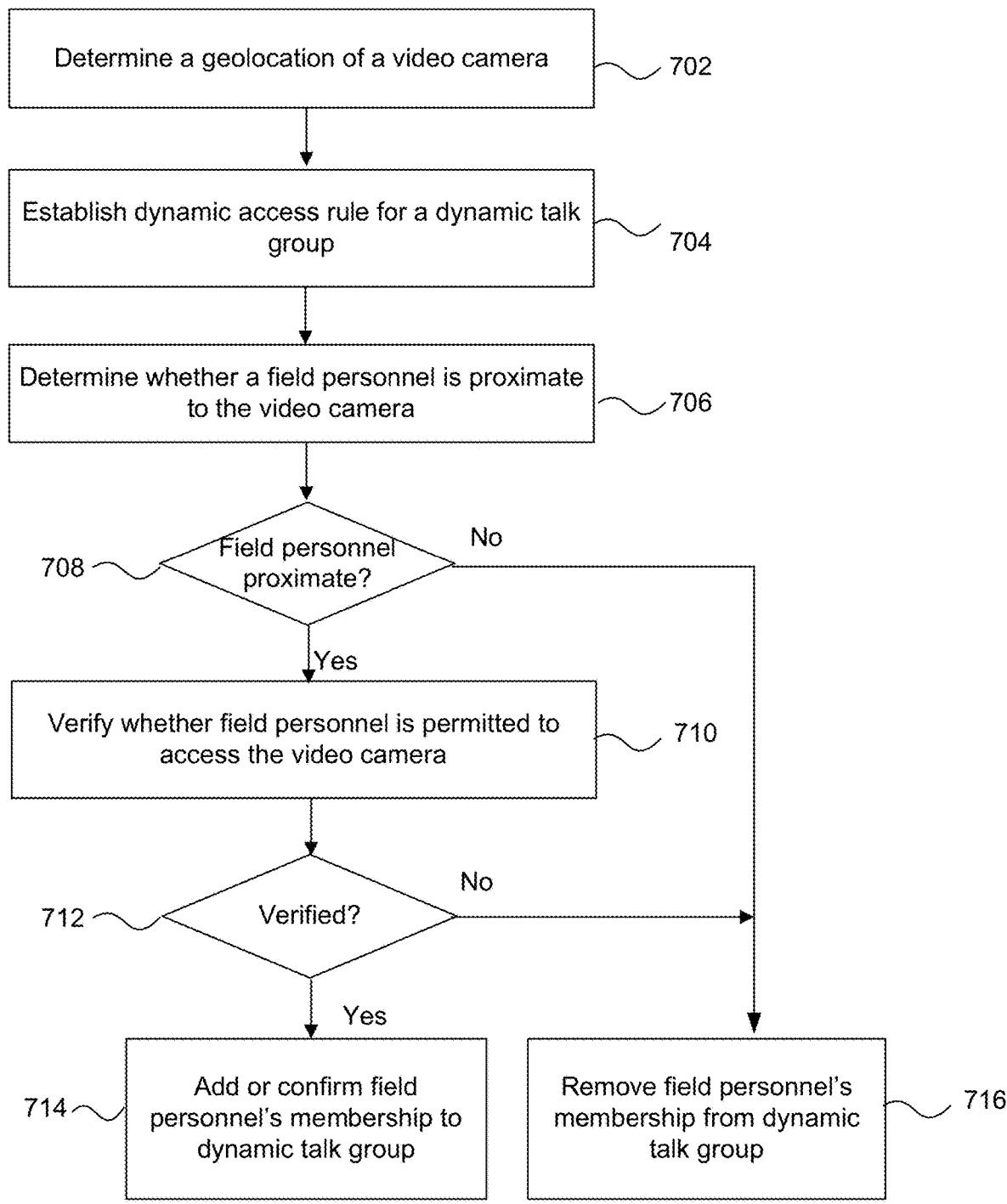

FIG. 7 is a flow chart of a method for establishing a dynamic talk group to be coupled to a video feed, according to an example embodiment.

Figure 8:
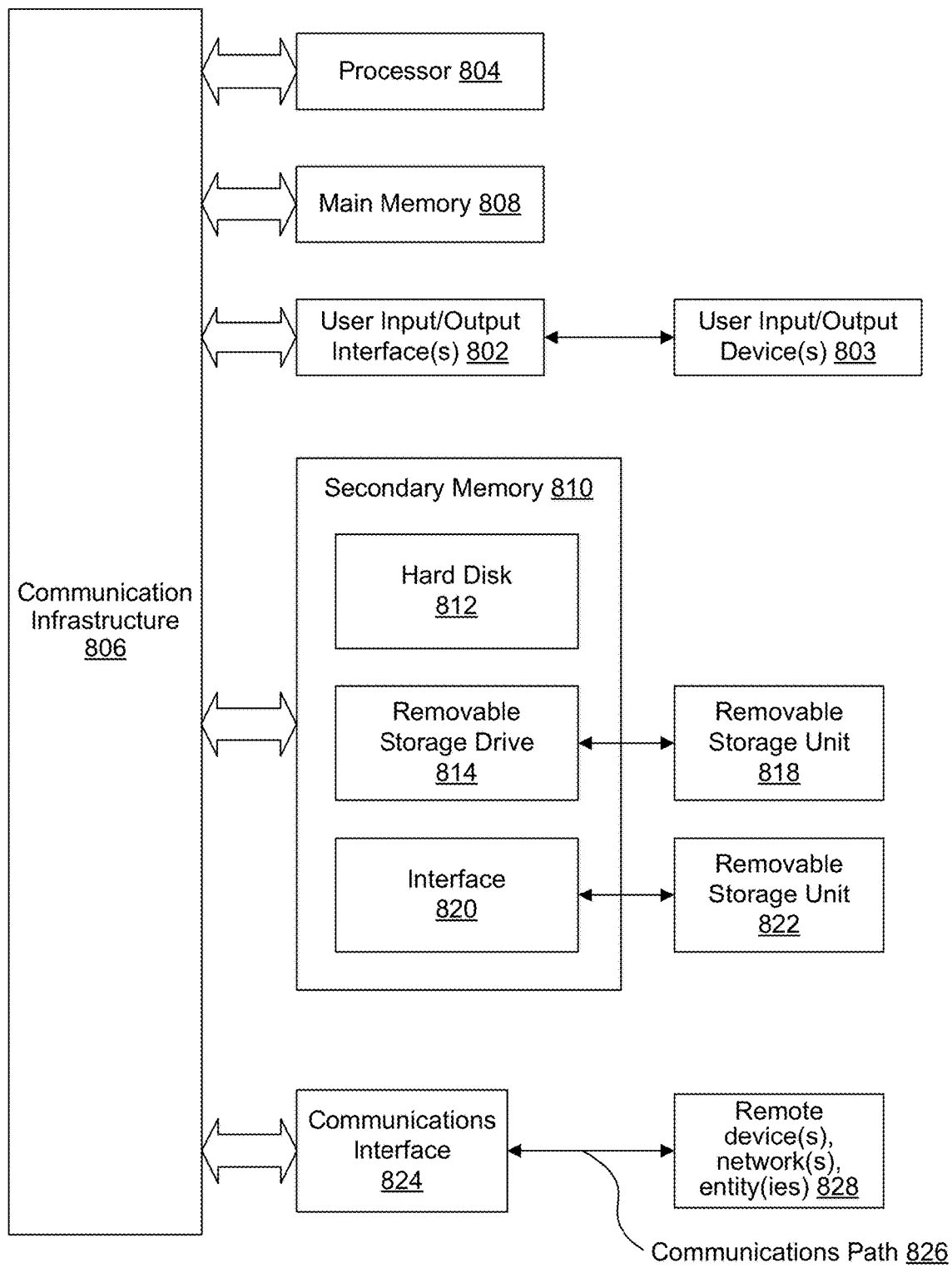

FIG. 8 is a diagram of an example computing system, according to an example embodiment.

The drawing in which an element first appears is typically indicated by the leftmost digit or digits in the corresponding reference number. In the drawings, like reference numbers may indicate identical or functionally similar elements.

DETAILED DESCRIPTION

System

Figure 1:
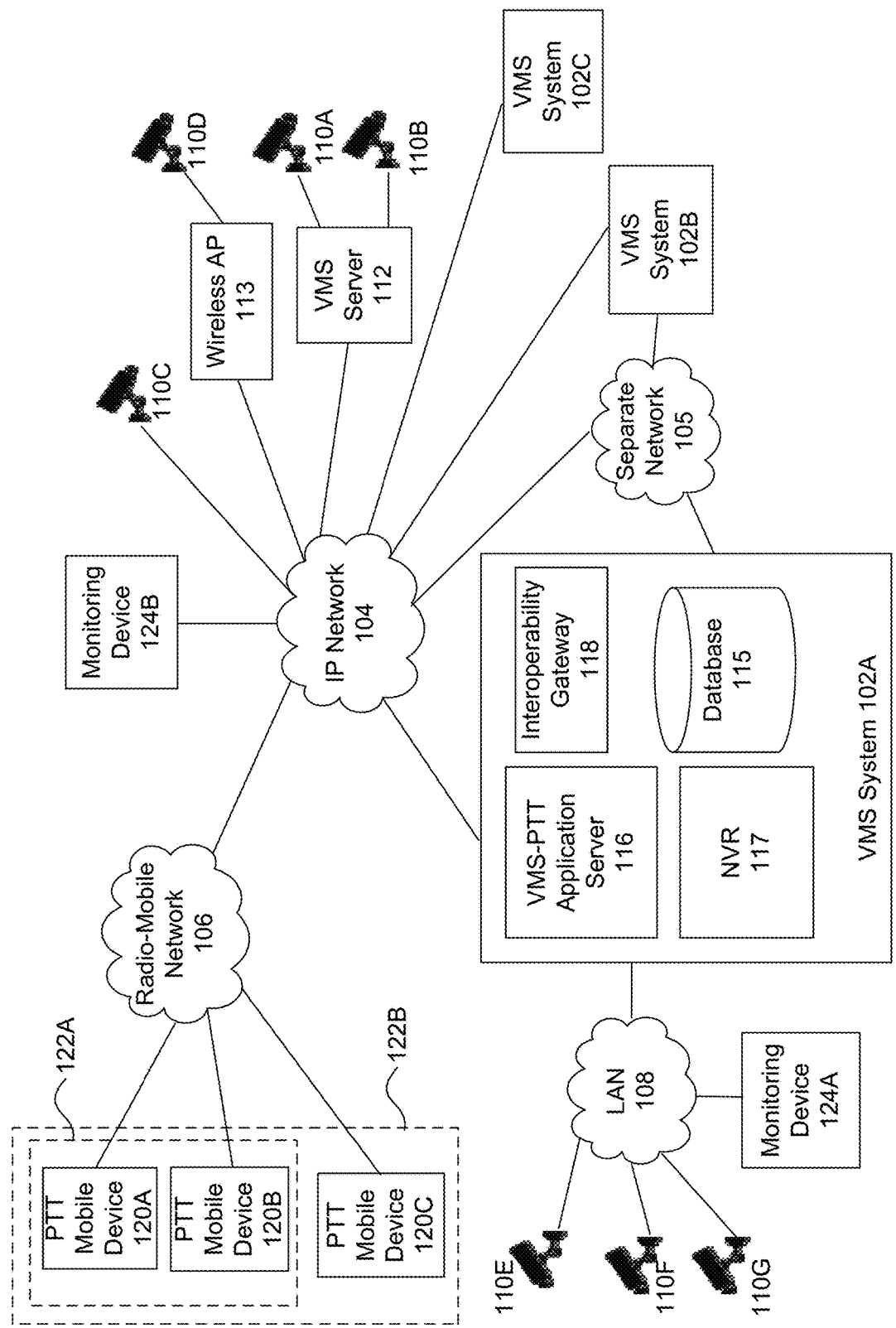
FIG. 1 is a block diagram of a system for providing embedded Push to Talk (PTT) functionality within a video management software (VMS) system, according to an example embodiment.

FIG. 1 is a block diagram illustrating an example system 100 for providing embedded Push to Talk (PTT) functionality within video management software (VMS) systems, according to an example embodiment. As shown, system 100 illustrates VMS systems 102, VMS server 112, video cameras 110, monitoring devices 124, PTT mobile devices 120, and networks including, for example, radio-mobile network 106, Local Area Network (LAN) 108, and Internet Protocol (IP) Network 104. One or more of the devices or systems shown may be implemented on one or more computing devices using hardware, software, or a combination thereof. Such a computing device may include, but is not limited to, a device having a processor and memory, including a non-transitory memory, for executing and storing instructions. The memory may tangibly embody the data and program instructions. Software may include one or more applications and an operating system. Hardware may include, but is not limited to, a processor, memory, and graphical user interface display. The computing device may also have multiple processors and multiple shared or separate memory components. For example, the computing device may be a part of or the entirety of a clustered computing environment.

VMS system 102A-C may each include a variety of network interfaces (not shown) including wireless and wired network interfaces to support a variety of network protocols. Each VMS system 102, may implement and host one or more VMS applications for integrating PTT functionality across one or more PTT mobile devices 120 with the management of one or more video cameras 110 across one or more networks. In an embodiment, VMS system 102A, for example, may manage or monitor video cameras 110E-G through LAN 108 and video cameras 110A-D through Internet Protocol (IP) network 104.

Video cameras 110 may be mounted surveillance video cameras that are analog cameras or IP cameras, which may be powered over Ethernet cables (PoE). Such surveillance cameras may have pan, tilt, and zoom (PTZ) capabilities. In an embodiment, video camera 110 may capture a video feed and metadata associated with an operating status of the video camera to be transmitted, via a network, to one or more of VMS systems 102 managing video camera 110. The metadata may include at least one of the following information related to video camera 110: unique video camera identifier (ID), group video camera ID, one or more associated user IDs, geolocation information, timestamp of captured video, direction, inclination, angle, moment, velocity, acceleration, or other environmental parameters.

For example, video cameras 110A-D may be representative of surveillance cameras mounted near bus stops, at traffic intersections, or within office buildings. Video cameras 110A-B may be managed through VMS server 112 having connection to IP network 104. VMS server 112 may therefore forward video, audio, or metadata captured by video cameras 110A-B to VMS system 102A, for example, through IP network 104. In an embodiment, VMS server 112 may include digital video recorder (DVR) or network video recorder (NVR) capabilities in order to store or record video and metadata captured by video cameras 110A-B.

In an embodiment, video cameras, such as video cameras 110D, may be coupled to wireless access point (AP) 113 that transmits captured metadata to VMS system 102A through IP network 104. In a further embodiment, video cameras, such as video camera 110C, may include networking hardware to connect to IP network 104 directly. In an embodiment, one or more video cameras 110, such as video camera 110C, may be wearable video cameras worn by field personnel.

In an embodiment, to integrate various communications functionality, e.g., PTT functionality, within a VMS system, VMS system 102A may include VMS-PTT application server 116, database 115, network video recorder (NVR) 117, and interoperability gateway 118.

Figure 3:
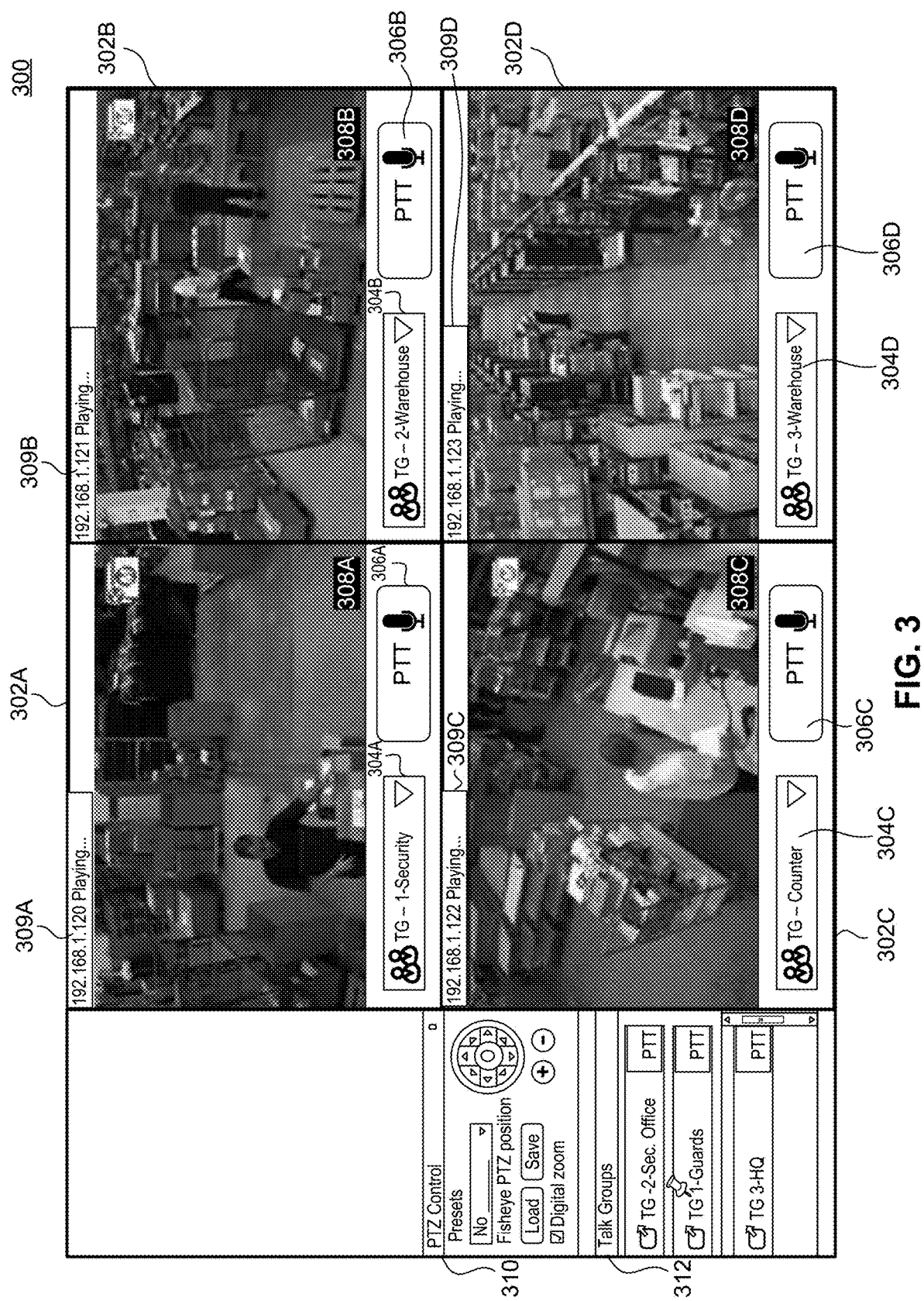
FIG. 3 is a diagram of a VMS GUI view, according to an example embodiment.

VMS-PTT application server 116 may host the VMS application or provide the functionality of the VMS application through one or more VMS graphic user interfaces (GUI) such as those exemplarily illustrated in FIGS. 3-5 that will be further described. In an embodiment, the VMS application may be a server-based software application communicatively coupled to software PTT clients installed and operating on computing devices, such as PTT mobile devices 120 or monitoring device 124. In an embodiment, the installed software PTT clients may instead be application instances of the VMS application.

In an embodiment, VMS-PTT application server 116 may enable an operator of the VMS application to engage in PTT communications with members of a voice communications group (i.e., a talk group), such as field personnel operating one or more PTT mobile devices 120A-B of talk group 122A, that is logically associated with one or more selected video feeds of the one or more video cameras 110. In an embodiment, when the operator enables an active transmission mode, the operator's PTT client transmits the operator's voice communication to each member of the talk group, specifically, to each PTT client of respective members' PTT mobile devices. PTT clients may also enable transmission and receipt of real time voice communications, video streams, files, text, and other data resources between and among users who are members of a talk group.

For example, the operator may detect a car crash being captured by video camera 110D that is logically associated with talk group 122A having members that are within, for example, a three mile radius of video camera 110D. Thus, the operator may talk to field personnel using PTT mobile devices 120A-B about the incident captured by video camera 110D. The operator may access the VMS application through LAN network 108 using monitoring device 124A or, in an embodiment, through IP network 104 using monitoring device 124B. In an embodiment, the operator role may be permitted to a field user operating one or more of PTT mobile devices 120.

Talk groups 122, such as talk group 122A, is a logically defined communications group comprised of PTT users, such as field personnel using PTT mobile devices 120. In an embodiment, a PTT mobile device, such as PTT mobile device 120A, may be a member of more than one talk group including, for example, talk groups 122A-B based on determinations by one or more VMS systems 102. Similarly, an operator may be capable of communicating with one or more talk groups 122 established by VMS system 102A. In an embodiment, VMS system 102A may use parameters and characteristics of field personnel, their corresponding PTT mobile devices 120, operator settings, video cameras 110, or any combination thereof to determine that talk group 122B, for example, includes PTT mobile devices 120A-C. In an embodiment, upon determining talk group members, VMS system 102A may initiate a process to invite and add the field member as a member of the talk group.

Interoperability gateway 118 coupled to VMS-PTT application server 116 may be further coupled to two-way mobile radio systems such as land mobile radio (not shown) serving mobile radios and other end point communications devices ("off-net PTT devices") that are members of other off-net PTT networks (not shown) such as the public telephone switched networks, other land mobile radio networks, mobile telephone networks, and private multimedia broadband networks. Through this coupling, interoperability gateway 118 may enable IP voice and data messages to be transmitted to and received from the off-net PTT devices not connected to IP network 104.

In an embodiment, interoperability gateway 118 may include logic to enable multimedia communications including, but not limited to, video file or video camera feed data to be transmitted to or shared with a separate or distinct VMS system, such as VMS systems 102B or 102C. Each of VMS systems 102B and 102C may operate a different communication or network interface. In an embodiment, interoperability gateway 118 may transmit the multimedia communications to interoperability gateways or console applications residing on separate network 105, such as a FirstNet network, or within, for example, VMS system 102B. Each of separate network 105 and VMS system 102B may be under the control or administration of an agency or operator different from that administering VMS system 102A.

Additionally, there may exist two or more networks of communications or agencies, each having different secrecy classifications. In an embodiment, interoperability gateway 118 may be coupled to or include a cross-domain information sharing system. Interoperability gateway 118 may validate a video feed's sharing permissions based on metadata associated with or embedded within the video feed. Upon validation, interoperability gateway 118 may retransmit or authorize transmission of the video feed to VMS systems 102 or across other networks.

Database 115 may be any type of structured data store, including a relational database that stores information associated with entities using the VMS application provided by VMS system 102A or associated with entities being controlled through VMS system 102A. For example, information associated with using entities may include information or parameters of operators and associated computing devices 124, and field users and associated PTT mobile devices 120. Information associated with controlled entities may include information or parameters of talk groups 122 and associated members, and controls or metadata of video cameras 110.

NVR 117 may be one or more video storage devices having application software for storing, searching, and retrieving stored video files. In an embodiment, NVR 117 may store video files in association with meta data tags, keywords, and other associated information files that are relationally associated with the video file and/or which are embedded as meta data within the video format and stored file. For example, other associated information associated with the video file may include attributes, such as a talk group or users, that are assigned to video camera 110 providing the video feed stored as the video file.

Therefore, NVR 117 may enable an operator accessing the VMS application to not only view a live video feed but also retrieve stored video feeds of video cameras 110 based on one or more search criteria. In an embodiment, an operator may input a talk group as a search criterion within the VMS application managed by VMS-PTT application server 116. NVR 117 may receive the search criterion and query the stored video files based on the search criterion to locate one or more video files associated with the search criterion. In an embodiment, NVR 117 may be representative of a system of devices, each of which may be implemented on one or more processors.

In an embodiment, NVR 117 or VMS-PTT application server 116 may additionally provide a video editing application that allows an operator of the VMS application to edit the recalled/retrieved video file and draw additional information through a graphical overlay via an editing application and/or edit or write additional metadata. The additional metadata, edits, or drawn information may be stored by NVR 117 or database 115.

PTT mobile devices 120 may be a mobile computing device (e.g., a smart phone, a tablet, a personal digital assistant (PDA), or a laptop computer) that includes a PTT client application or instance of the VMS application for accessing the VMS application provided or hosted by VMS system 102. In an embodiment, a field user may interface with PTT mobile device 120 through a VMS GUI provided through the PTT client. In an embodiment, a PTT client on, for example, PTT mobile device 120A may have access to the capabilities of PTT mobile device 120A that may include a touchscreen, a camera, a scanner, a text recognition interface, a location determiner (e.g., a Global Positioning System (GPS)), a speech recognizer, or a voice recorder. Information generated from these capabilities such as location information in space and time may be transmitted to other field users through PTT clients installed on respective PTT mobile devices 120, to VMS systems 102, or operators of monitoring devices 124.

Monitoring device 124 may be one or more stationary devices at a control monitoring center or station that are used by one or more operators to monitor one or more video cameras 110. An operator may interface with a PTT client or VMS application instance on the monitoring device 124 to access the video feeds provided by video cameras 110. In an embodiment, the operator need not use monitoring device 124 to control or access or operate the VMS application provided by VMS system 102A. Instead, an operator may be a field personnel using one or more of PTT mobile devices 120.

Figure 2:
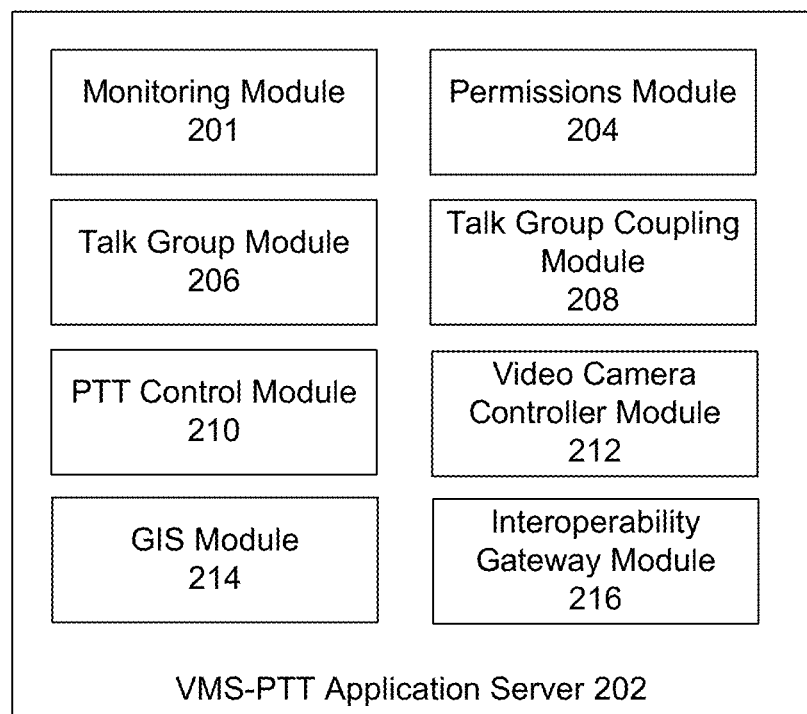
FIG. 2 is a block diagram of a VMS application server, according to an example embodiment.

FIG. 2 is a block diagram of VMS-PTT application server 202 for hosting or implementing a VMS application that provides a VMS GUI or PTT communication interface to operators or field personnel, according to an example embodiment. VMS-PTT application server 202 may provide the VMS GUI to users using devices having PTT clients or an instance of VMS application, such as PTT mobile devices 120 from FIG. 1 or monitoring devices 124 from FIG. 1. In an embodiment, VMS-PTT application server 202 may be an exemplary implementation of VMS-PTT application server 116 of VMS system 102A from FIG. 1. Though depicted as a single server, VMS-PTT application server 202 may be implemented across a distributed network using one or more servers.

In an embodiment, VMS-PTT application server 202 may include various modules (or components) to implement the functionality of the provided VMS GUI. For ease of understanding, descriptions of the modules of FIG. 2 will refer to FIG. 3, which illustrates an example VMS GUI view 300. A module (or component) of VMS-PTT application server 202 may include a selection of stored operations that when executing in one or more processors of VMS-PTT application server 202 causes the one or more processors to perform the operations of the module. Each module is described below in turn:

Monitoring module 201 may provide to PTT clients on PTT mobile devices 120 or monitoring devices 124 respective VMS GUIs such that an operator may efficiently communicate to select field personnel operating respective PTT clients. In an embodiment, monitoring module 201 may provide to an operator of monitoring device 124A the example VMS GUI view 300 of FIG. 3. VMS GUI view 300 of FIG. 3 displays interactive multimedia objects (IMMOs) 302, each of which may include the following coupled components: talk group coupling component 304, embedded PTT control component 306, video feed component 308, video camera identification (ID) component 309. In an embodiment, VMS GUI view 300 may display PTZ control component 310 and talk groups component 312.

In an embodiment, monitoring module 201 may provide an operator access to, for example, four distinct video feeds displayed within corresponding video feed components 308A-D of respective IMMOs 302A-D of VMS GUI view 300. Each video feed 308 may originate from a corresponding video camera 110, which is designated by video camera ID 309. Video camera ID 309 may be an IP address or any sequence of characters that uniquely identifies video camera 110 providing the video feed displayed by video feed component 308. In an embodiment, monitoring module 201 may enable the operator to select the number of IMMOs 308 and one or more specific video feeds to be displayed within corresponding IMMOs 308 depending on attributes of the operator or video cameras 110 as further described. In an embodiment, the selected one or more video feeds may be transmitted by monitoring module 201 to each member of talk groups coupled to the corresponding one or more video feeds.

Though the operator has been described as being human, in an embodiment, the operator may be human with machine assistance or entirely machine-based. For example, the operator may be a video analytics module within monitoring component 202 that selects specific video feeds to be displayed within IMMOs 302. The video analytics module may interpret and process video images from video feeds captured by video cameras 110 and select a subset of video feed views to monitor based on rules and parameters configured by a human operator or administrator. In an embodiment, the video analytics module may use the rule or parameters to implement algorithms, dictionaries, neural nets, or statistical or heuristic methods to recognize or detect objects, events, or patterns of interest to the human operator or administrator. An entirely or partially machine-assisted operator may be further defined by parameter and rules for determining talk group(s) and initiating PTT communications with the determined talk group(s). Additional examples of rules or parameters include associated sensor information alerts, visual or electronic distress signals, or detected beacon activation.

In an embodiment, the video analytics module may be implemented on a computer processing chip of video camera 110, on a module embedded or coupled to video camera 110, on a computer processing device remotely executing software that is coupled by a communications network to video camera 110, or on a combination of any module or device listed. In an embodiment, upon detecting an event or pattern of interest captured by, for example, video camera 110A, monitoring module 201 may notify a human operator or prompt the operator to select the video feed provided by video camera 110A to be displayed within a IMMO, such as IMMO 302A of VMS GUI 300.

In an embodiment, monitoring module 201 may provide independent VMS GUIs within PTT clients to corresponding users, such as field personnel or operators of PTT mobile devices 120 of FIG. 1, such that each VMS GUI may display a group of video feeds appropriate to the user.

In an embodiment, monitoring module 201 may include a video coding module to improve a quality of video feeds. The video coding module may include coding functions to control the video feed by decoding, re-encoding or transcoding, storing and forwarding, injecting with metadata. In an embodiment, these coding functions may be implemented on within VMS-PTT application server 202, mobile devices 120, monitoring device 124, or a separate media server application within VMS system 102A. Monitoring module 201 may implement transmission of video feeds to and from PTT clients via UDP, TCP or other data transmission protocol and may employ packet stream replication, packet relay, multicasting, broadcasting, or other transmission means.

Permissions module 204 may assign attributes to users, such as field personnel and operators, using PTT mobile devices 120 or monitoring device 124. An assigned attribute of a user may include any of the following: an identity, a job title, one or more talk groups, position, one or more group, one or more task, one or more video camera, one or more agency or group affiliations, one or more access privilege status, or one or more priority settings. The assignments may be received from, for example, an administrator, a human resources manager, or the user's supervisor. In an embodiment, permissions module 204 may store the attributes of the user and permission settings associated with each attribute in database 115 of FIG. 1. In an embodiment, permissions module 204 may independently assign attributes to video cameras 110. In addition to the listed attributes, permissions module 204 may, for example, assign video camera 110A a proximity attribute that indicates a distance or communication range from video camera 110A. Therefore, database 115 may store associations between video camera ID 309 and one or more attributes such that a user having at least one of the one or more attributes may have permission to access video camera 110 designated by video camera ID 309.

In an embodiment, priorities associated with an assignment may be used in determining an order or sequence to execute concurrent commands from a plurality of authenticated and authorized members of a talk group. Concurrent commands may include, for example, sending and receiving of voice messages.

For example, an operator may have a role attribute indicating the operator's monitoring task and field personnel may be assigned a role attribute indicating a first responder task. Therefore, if an operator and a field personnel send concurrent voice messages, the role attributes may enable the operator to have a higher priority when sending voice messages.

In an embodiment, an attribute may be dynamically assigned. For example, a dynamically assigned attribute of a user may include a dynamic talk group, a geolocation of user based on an associated PTT mobile device 120, or whether the user is within proximity of video camera 110. In an embodiment, permissions module 204 may determine whether the user is within proximity of any video camera 110 based on the assigned dynamic talk group, or the geolocation attribute and received or stored geolocations of each video camera 110. Relatedly, in an embodiment, permissions for accessing video cameras 110 may be dynamically updated based on dynamically assigned attributes.

In an embodiment, if a module, such as monitoring module 201, requests access to video camera 110A based on operator input (which may be machine-assisted), permissions module 204 may query database 115 to determine whether the operator is authorized to access video camera 110A. For example, permissions module 204 may associate an attribute of "John Smith" (an identity) and "Area 1" (a group ID) with video camera 110C such that the operator or user is authorized if the user is "John Smith" or is assigned a group ID of "Area 1."

Talk group module 206 may manage, establish, or assign talk groups based on user attributes or video camera attributes. As discussed, a talk group is a logically defined voice or PTT communications group that allows members to send and receive voice messages to and from other member users in the talk group. In an embodiment, talk group module 206 may store current members of an established talk group within one or more talk group tables within database 115.

In an embodiment, a talk group may be defined or pre-assigned by a user including a field user or an operator using talk group component 312 depicted in FIG. 3. For example, talk group module 206 may receive from a user a talk group ID of a talk group and one or more attributes that members of the talk group must share. Based on the one or more attributes selected by the user, talk group module 206 may query database 115 storing user and attribute associations to determine one or more users assigned the one or more attributes to add to the established talk group. In an embodiment, one or more talk groups may be pre-assigned to one of video camera ID 309, effectively associating the one or more talk groups with the corresponding video camera 110 having video camera ID 309.

In an embodiment, talk group module 206 may be requested by an operator to establish a dynamic talk group based on a dynamically assigned attribute of a user. For example, talk group module 206 may receive a proximity threshold attribute to be associated with video camera 110A providing, for example, the video feed of video feed component 308A. Talk group module 206 may query database 115 to determine users or field personnel having a proximity-based attribute indicating that one or more of their PTT mobile devices 120 are within the received proximity threshold attribute. In an embodiment, talk group module 206 may be requested to re-evaluate whether a user should continue to be a member of the talk group when the proximity-based attribute changes. If the user no longer satisfies the attribute of the talk group, talk group module 206 may dynamically remove the user as a member of the established talk group.

As described, talk group module 206 may dynamically determine members to be added to the established talk group based on a dynamically or statically assigned attributes of users. For example, talk group module 206 may determine a member of the talk group based on whether a distance between geolocations, which are dynamically assigned attributes, of PTT mobile devices 120 operated by respective users and video camera 110A are within a proximity threshold. In an embodiment, talk group module 206 may receive geolocations of PTT mobile device from PTT mobile device 120 or another device having location-determining capabilities and coupled to PTT mobile device 120. In an embodiment, the device having location-determining capabilities, such as PTT mobile device 120 having a GPS, may determine a distance between the device and one or more video cameras 110. Then, the device may send the determined distance to be used by talk group module 206 to determine proximity of the device to the one or more video cameras 110.

In an embodiment, an attribute of a user may be whether the user's PTT mobile device 120 is within a communication range of a beacon or has been within range for a predetermined period of time. A beacon may be a sensor or other wireless communication device that may be associated with or placed near, for example, video camera 110A. In an embodiment, PTT mobile device 120 may receive from the beacon a wireless signal or information that furnishes location or other information from which location of the beacon or an approximate location of PTT mobile device 120 or other device coupled to PTT mobile device 120 can be determined. Therefore, the attribute may be assigned based on beacon information indicating location, GPS information of mobile device 120, or a combination thereof.

In an embodiment, talk group module 206 may additionally or alternatively determine that users are within proximity of video camera 110A based on information gathered by video camera 110A. For example, the user may be within a proximity threshold of video camera 110A if the user is visually detected and recognized within a field of view of video camera 110A within a predetermined period of time. In an embodiment, an analytics module implemented in VMS-PTT application server 116 or in video camera 110A may identify the user based on detectable light emission parameters of the video feed. The parameters include facial pattern recognition, infrared beacon associated with the user, or a wearable visual identifier such as symbol or color or pattern.

Talk group coupling module 206 may logically associate a talk group with a video feed provided by a video camera by coupling the talk group to an embedded PTT component associated with the video feed or video camera. In an embodiment, talk group coupling module 206 logically associates each talk group coupling component 304 with components of corresponding IMMOs 302: embedded PTT control component 306, video feed component 308, and video camera ID component 309. In an embodiment, talk group coupling module 206 may associate a talk group with an IMMO 302 including more than one video feed component 308. In the embodiment shown in VMS GUI view 300, talk group coupling module 206 may logically and visually associate, for example, the talk group "TG-1 Security" with video feed component 308A or embedded PTT control component 306A within IMMO 302A.

In an embodiment, talk group coupling module 206 selects the talk group to be coupled to an embedded PTT control component based on an input received from an operator from talk group coupling component 304 depicted in VMS GUI view 300. In this embodiment, talk group coupling component 304 acts as a selector control component for selecting one or more talk groups. For example, talk group coupling component 304C may provide a list of talk groups from which the operator may select to logically and visually associate with video feed component 308C. As shown, talk group "TG-Counter" was selected and talk group coupling module 206 couples the talk group "TG-Counter" to embedded PTT control component 306C.

In an embodiment, a talk group may be selected from talk groups established by talk group module 206, which may depict a subset of established talk groups within talk group component 312. In an embodiment (not shown), talk group coupling component 304 may enable an operator to select more than one talk group to be logically or visually associated with one or more video feed components 308.

In an embodiment, upon logically associating a talk group with a video feed, talk group coupling module 206 may update one or more attributes, or update or grant permissions of each member of the talk group with respect to one or more components of IMMO 302 containing the video feed. Talk group coupling module 206 may update database 115 directly or request permissions module 204 to perform the updates. For example, upon logically associating talk group "TG-2-Warehouse" with video feed component 308C, talk group coupling module 206 may grant each member access to the video feed displayed within video feed component 308B and prioritized remote control of video camera 110B designated by video camera ID 309B.

PTT control module 210 may detect that an embedded PTT control component, such as embedded PTT component 306A, associated with a video feed, such as a video feed displayed by video feed component 308A, is being or has been activated. Upon detection, PTT control module 210 may enable PTT communications regarding content displayed by a video feed between an operator and each member of a talk group, such as "TG-1 Security" displayed by talk group coupling component 304A, coupled to the video feed. PTT communications may include PTT voice functions and commands distributed across one or more networks, such as IP network 104 and radio-mobile network 106.

In an embodiment, to more effectively integrate PTT two-way communication into VMS system 102, PTT control module 210 may present VMS GUI view 300 that couples one embedded PTT control component 306 for each IMMO 308, which may each include one (as shown) or more (not shown) video feeds.

In an embodiment, PTT control module 210 may enable various types of communication resources to be transmitted by one or more members to each other member within a talk group. For example, such communication resources may include data generated by a member operating, for example, PTT mobile device 120A. In an embodiment, the data generated may include at least one of the following: video feed, images, readable files, audio messages, and text messages. PTT control module 210 may display components to send and display or execute the generated data within corresponding IMMOs of VMS GUI view 300.

Video camera controller module 212 may control one or more video cameras 110 managed by VMS-PTT application server 202 based on a received remote command. In an embodiment, video camera controller module 212 may receive the remote command for a video camera, such as video camera 110E, from an operator of PTT mobile device 120B. In an embodiment, the remote command may affect a metadata captured by video camera 110. For example, the remote command may be a direction, inclination, angle, moment, velocity, or acceleration, tilt, pan, or zoom of video camera 110.

In an embodiment, upon receiving the remote command, video camera controller module 212 may request permissions module 204 to authorize the operator or user. If the user is authorized, video camera controller module 212 may transmit an electronic request to the corresponding video camera 110 to perform the remote command. In an embodiment, multiple commands may be concurrently received by multiple operators. In such a scenario, remote commands of respective users may be prioritized based on one or more attributes assigned to users. For example, it may be more beneficial for an operator using PTT mobile device 120C that is within proximity of, for example, video camera 110B to be given higher control priority than another operator that is not within proximity of video camera 110B.

Geographic information system (GIS) module 214 may present a map interface within a VMS GUI provided by PTT clients or VMS application instances operated by PTT mobile devices 120 or monitoring devices 124. In an embodiment to be further described in FIG. 5, GIS module 214 may display one or more IMMOs 302 from VMS GUI view 300 on a map such that each IMMO 302 is positioned on the map to correlate with a geolocation of each video camera 110 providing video feed components 308 of corresponding IMMOs 302. In an embodiment, a floor plan interface may be displayed instead of a map if geolocation data of video cameras 110 and PTT mobile devices 120 may be determined or approximated to within a few meters, e.g., 5 meters.

Interoperability gateway module 216 may communicate with interoperability gateway 118 of FIG. 1 to enable an operator to communicate IP voice, video, or other data messages to be transmitted and received from VMS systems 102B-C or off-net PTT devices. In an embodiment, interoperability gateway module 216 may perform some or all of the functions an operations performed by interoperability gateway 118.

FIGS. 4A-C are diagrams illustrating example VMS GUI views, according to an example embodiment. As shown, each of FIGS. 4A-C may represent a VMS GUI view of a VMS application running on PTT clients of, for example, PTT mobile devices 110. One or more of the components depicted by FIGS. 4A-C may correspond to components described in FIG. 3 and implemented by one or more previously described modules of FIG. 2.

FIG. 4A illustrates a VMS GUI view showing an embedded PTT control component visually coupled to a group of video feeds, according to an example embodiment. In this example, the group of video feeds are provided by corresponding video cameras identified by unique video camera IDs "192.168.4.123," "192.168.4.124," "192.168.4.125," and "192.168.4.126." As shown, the embedded PTT control component is further coupled to a talk group coupling component indicating a current logically associated talk group, "TG-2—Sec. Office Dispatch."

In an embodiment, an operator using a device and viewing the VMS GUI view of FIG. 4A may touch or push the "Push to Talk" embedded PTT control component to send voice communications to all members within the active talk group, "TG-2—Sec. Office Dispatch," and likewise, can hear audio communications transmitted from other members of the talk group.

FIG. 4B illustrates a VMS GUI view where the talk group coupling component has been selected by an operator to select another talk group, according to an example embodiment. As shown, the talk group coupling component provides four available and selectable talk groups. The number or types of talk groups available to the operator may be based on one or more attributes of the operator as assigned or determined by the VMS-PTT application server providing the VMS GUI, for example VMS-PTT application server 202 of FIG. 2. In an embodiment, the VMS GUI view may provide an active members component listing each member of the currently selected talk group. For example, FIG. 4B shows that "Jane Doe" and "Bob White" are current members of the highlighted talk group "TG-1—Security Guards."

FIG. 4C illustrates a VMS GUI view where the current talk group has been changed from "TG-2—Sec. Office Dispatch" to "TG-1—Security Guards," accordingly to an example embodiment. Accordingly, the "TG-2—Sec. Office Dispatch" talk group is decoupled from the embedded PTT control component and members of the "TG-2—Sec. Office Dispatch" talk group may not have access to video feed associated with video camera ID 192.168.4.125 based on membership alone. But, in an embodiment, a member of both "TG-2—Sec. Office Dispatch" and "TG-1—Security Guards" may continue to have access to the video feed.

In an embodiment, a PTT client on mobile device 120 and providing one or more of VMS GUI of FIGS. 3 and 4A-C may enable an operator of the PTT client to select one or more video camera view feeds displayed and transmit or direct video camera feeds to other PTT clients within the active talk group. In the embodiment depicted in FIG. 4C, an operator may have selected a video feed view (or a group of video feed views) from multiple video feed views depicted in FIG. 4A. A monitoring module, such as monitoring module 201 of FIG. 2, may resize the selected video feed view to become a single view in a larger view format where other video feed views may be minimized.

As shown by the poor quality of the video feed shown in FIG. 4C, transmission quality of video camera feeds selected by an operator may be affected by receiving and retransmitting, or directing the transmission of, the selected video feed content via a network to the PTT clients. As described, monitoring module 201 may be used to improve the quality of the displayed video feed.

In an embodiment, regardless of the quality of video feed shown in FIG. 4C, the operator may request monitoring module 201 to provide a higher definition video feed stream. In an embodiment, an operator's request changes parameters of video decoders associated with recipient PTT mobile devices 120 to accept a higher video frame rate or definition. In an embodiment, monitoring module 201 may multicast or broadcast the video feed to PTT mobile devices 120 with different data, different definition or frame rates, different transmission protocols, different video encoding schemes, reproductions, or versions or copies of the original video feed source stream. In an embodiment, the optimal video receiving rate and format of the video feed received by each PTT mobile device 120 may be dependent on one or more of hardware availability, software versions, received bit error, packet dropping, connectivity strength, or available broadband data bandwidth availability of respective PTT mobile device 120.

FIG. 5 is a diagram illustrating a VMS GUI view 500, according to an example embodiment. VMS GUI view 500 depicts map 518 implemented by a GIS module of a VMS-PTT application server, such as GIS module 214 of FIG. 2. In an embodiment, the GIS module positions IMMOs 502 (as shown) within map 518 to correlate the geolocations of the video cameras providing respective video feed components 508.

Similar to FIG. 3, a monitoring module of the VMS-PTT application server, such as monitoring module 201, may display one or more IMMOs 502, each of which may be logically associated with the following components: talk group coupling component 504, embedded PTT control component 506, and video feed component 508. In an embodiment, each IMMO 502 may be logically or visually associated with respective video sending components 510, proximate members components 512, video camera location icons 514, and proximity range component 516.

Video sending component 510, when requested by an operator, may distribute view of video feed component 508 to each member of the talk group, such as "TG: −2 Patrol" if video sending component 510A is enabled, selected within talk group coupling component 504.

Proximate members components 512, when requested by the operator, may show or reveal members of a talk group within proximity of the video camera providing video feed component 508. In an embodiment, the range of proximity may be set by proximity range component 516 based on operator input or a proximity threshold attribute assigned to the video camera. In an embodiment, proximate members component 512 may be representative of an always active dynamic talk group having members that are proximate to corresponding video cameras.

In an embodiment, IMMO 502 may execute an audio alert, a visual alert, a visual designation, or a combination thereof to indicate the proximate presence, or non-presence, of a member of an associated talk group in relation to a video camera. The talk group may be based on the talk group coupling component 504, proximate members component 512, or both. In an embodiment, other information associated with talk group members including heart rate, blood pressure, perspiration, or acceleration may be visually displayed or represented within IMMOs 502 or another window, frame, or object associated with respective IMMOs 502.

Video camera location icons 514 may be a visual icon representative of respective IMMOs 502 that are smaller than IMMOs 502 and obscures as little of map 502 as possible. Video camera location icons 514 may be selected and de-selected to maximize or minimize IMMOs 502, respectively.

In an embodiment, the grouping of components of IMMOs 502 and components' or IMMOs' presence and relative positioning within map 502 of VMS GUI view 500 may be organized based on rules or parameters. For example, whether specific components of IMMOs 502 available and orientation of video camera feed components 508 may be based on priority attributes associated with an operator viewing VMS GUI 500. In an embodiment, video camera feeds and associated IMMOs 502 may be prioritized, for example, enlarged, based on video camera attributes, such as image definition of video camera feed, functions or capabilities of the video cameras, or meta data generated from a video camera such as direction, altitude, speed, or detection of object of interest by a video analytic module.

Method

FIG. 6 is a flowchart of a method 600 for enabling PTT communications in a video management software (VMS) system, such as VMS system 102A of FIG. 1, using embedded PTT controls, according to an example embodiment. A VMS-PTT application server of the VMS system, such as VMS-PTT application server 202 of FIG. 2, may provide to an operator, such as a user using monitoring device 109 of FIG. 1 or PTT mobile device 120 of FIG. 1, a VMS GUI similar to those displayed in FIGS. 3-5. Method 600 can be performed by processing logic that may comprise hardware (e.g., circuitry, dedicated logic, programmable logic, microcode, etc.), software (e.g., instructions running on a processing device), or a combination thereof.

In step 602, a monitoring module of the VMS-PTT application server, such as monitoring module 201 of FIG. 2, monitors a plurality of video feeds provided by corresponding video cameras. The video cameras may be video cameras 110 of FIG. 1 distributed across one or more networks, including video cameras 110C-E across LAN 108 and video cameras 110A-B across IP network 104.

In an embodiment, the monitoring module presents video feed views of video cameras selected by an operator within video feed components of corresponding IMMOs displayed in the VMS GUI. For example, the exemplary VMS GUI view 300 of FIG. 3 displays a plurality of video feeds within video feed components 308 of corresponding IMMOs 302.

In step 604, a talk group coupling module of the VMS-PTT application server, such as talk group coupling module 208 of FIG. 2, logically associates a defined talk group with a video feed from the plurality of video feeds by coupling the talk group to an embedded PTT control component of an IMMO providing the video feed. For example, the exemplary VMS GUI view 300 of FIG. 3 depicts talk group coupling 304A that logically and visually associates a talk group with video feed component 308A of IMMO 302A. FIG. 3 shows that talk group 304 is also logically and visually coupled to embedded PTT control 306A of IMMO 302A.

In an embodiment, the operator may select a defined talk group to be logically associated with the video feed or a group of video feeds including the video feed. The selected talk group may be a talk group that is predetermined or dynamically established by a talk group module of the VMS-PTT application server, such as talk group module 206 of FIG. 2. In an embodiment, each talk group may have only members that share specified characteristics, such as a physical distance within proximity of a video camera. Embodiments related to selecting predefined and dynamic talk groups may be implemented by the talk group coupling module and a permissions module, such as permissions module 204 of FIG. 2, and further discussed in the descriptions of FIGS. 2-5.

In step 606, a PTT control module, such as PTT control module 206 of FIG. 2, detects that the embedded PTT control component of the IMMO associated with the video feed is activated. In an embodiment, an operator may observe or detect an event of interest, such as an emergency situation, captured by the video feed and activate the embedded PTT control component to communicate with an associated talk group regarding the observed event of interest. For example, the operator monitoring VMS GUI view 300 of FIG. 3 may activate embedded PTT control component 306C upon viewing a possible theft attempt on video feed 308C to communicate with talk group 304C. As discussed, in an embodiment, the operator may be partially or entirely machine-based and implemented as a VMS controller in the VMS-PTT application server. In this embodiment, the VMS controller may include programmed logic, rules, and parameters that when executed by the VMS application server detects whether an event of interest is being captured by the video feed. In an embodiment where the operator is at least partially machine-based, upon detecting an event of interest in step 606, the VMS controller may notify an operator of the detected event or prompt the operator to activate the embedded PTT control component.

In step 608, the PTT control module enables PTT communications with each member of the talk group regarding content displayed by the video feed logically associated with the talk group. In an embodiment, the operator may be considered an automatic member of the talk group. Upon detecting, in step 606, that the embedded PTT control component is activated, the PTT control module enables PTT communication between each member of the talk group coupled to the embedded PTT control component.

FIG. 7 is a flowchart of a method 700 for establishing a dynamic talk group to be coupled to one or more video feeds, according to an example embodiment. A VMS-PTT application server of the VMS system, such as VMS-PTT application server 202 of FIG. 2, may provide to an operator, such as a user using monitoring device 109 of FIG. 1 or PTT mobile device 120 of FIG. 1, a VMS GUI similar to those displayed in FIGS. 3-5. Method 700 can be performed by processing logic that may comprise hardware (e.g., circuitry, dedicated logic, programmable logic, microcode, etc.), software (e.g., instructions running on a processing device), or a combination thereof.

In step 702, a permissions module of the VMS-PTT application server, such as permissions module 204 of FIG. 2, determines a geolocation of each of the video cameras providing corresponding video feeds. In an embodiment, the permissions module may receive the geolocation from a video camera having GPS capabilities or a GPS-enabled device coupled to the video camera. In an embodiment, the geolocation of the video camera may be approximated based on known geo-coordinates of Wi-Fi access points accessed by the video camera. The determined geolocation for a video camera may be stored in database 115 and updated periodically or as needed.

In step 704, a talk group module, such as talk group module 206 of FIG. 2, establishes a dynamic access rule for adding field personnel to a dynamically managed talk group associated with a video feed from the plurality of video feeds. In an embodiment, the dynamic access rule includes a proximity component and an access component such that a field personnel must qualify under both components of the dynamic access rule. The proximity component may be a proximity threshold from the video camera such that a field personnel within the proximity threshold satisfies this component of the dynamic access rule. In an embodiment, the proximity component may be satisfied when a field personnel's presence near the video camera is detected. The access component may be a severity of an incident displayed in the video feed or at least one of a field personnel's information: common talk group membership, identity, position, task, job, title, agency or group affiliation, current status, or access privilege status.

In step 706, the talk group module determines whether one or more field personnel is proximate to the video camera and therefore satisfies the proximate component. A field personnel may be proximate to the video camera if within a defined proximity threshold. In an embodiment, the talk group module may query attributes assigned by the permissions module to determine a field personnel's proximity to the video camera. For example, the permissions module may assign a geolocation attribute to a field personnel based on a received geolocation of the field personnel from his mobile device or a geolocation of a device detecting the field personnel, such as a WiFi access point connecting the field personnel to a network. Using the geolocation attributes, the talk group module may compare the geolocations between the field personnel and the video camera to determine whether the field personnel is within the proximity threshold. In an embodiment, the VMS may execute facial recognition or personal ID software on the contents captured by the video feed to detect the field personnel. If the field personnel is being captured by the video feed, the field personnel may be determined as proximate to the video feed.

In step 708, if the field personnel is proximate to the video camera, method 700 proceeds to step 710. If the field personnel fails the proximate component of the dynamic access rule, method 700 proceeds to step 716.

In step 710, the talk group module determines whether the field personnel is permitted to access the video camera and therefore satisfies the access component. In an embodiment, the talk group module may query attributes assigned by the permissions module to determine a field personnel's permissions or lack thereof for accessing or controlling one the video feed of the video camera.

In step 712, if the field personnel is verified, method 700 proceeds to step 714. If the field personnel fails the access component of the dynamic access rule, method 700 proceeds to step 716. In an embodiment, the talk group module may electronically transmit an invitation to PTT mobile unit users who satisfy the dynamic access rule to join the dynamic talk group. An exemplary invitation process is further explained in patent application Ser. No. 14/609,815.

In step 714, the talk group module may add the field personnel satisfying the dynamic access rule to the dynamic talk group associated with the video feed. In an embodiment, if any component of the dynamic access rule is updated, steps 706-712 may need to be re-performed for each current member of the dynamic talk group. In an embodiment, the geolocation attribute of a field personnel may be updated. In this case, steps 706-712 may need to be re-performed for that field personnel.

In step 716, if the field personnel does not satisfy the dynamic access rule either by failing the proximity component in step 708 or the access component in step 712, the talk group module removes or confirms that the field personnel is not a member of the dynamic talk group. In an embodiment, if a current member of the dynamic talk group is determined to no longer satisfy the dynamic access rule, the talk group module may remove the current member from the dynamic talk group.

System Implementation

Various embodiments can be implemented, by software, firmware, hardware, or a combination thereof. FIG. 8 illustrates and example computer system 800 in which the systems and devices described within various embodiments can be implemented as computer-readable code and/or text-readable code. After reading this description, it will become apparent to a person skilled in the relevant art how to implement the embodiments using other systems and/or processing architectures.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. A method for a video management system (VMS) with Push to Talk (PTT) communications, comprising:
    monitoring a first video feed from a first video monitoring camera, and a second video feed from a second video monitoring camera, wherein the VMS comprises a first one-to-one communications modality between the first video monitoring camera and a monitoring console of an operator, and a second one-to-one communications modality between the second video monitoring camera and the monitoring console;
    presenting a VMS graphical user interface (GUI) on the monitoring console, wherein the VMS GUI includes a first interactive multimedia object (IMMO) and a second IMMO, wherein the first IMMO comprises: a first talk group coupling component associated with: a first embedded PTT control component and the first video feed, and wherein the second IMMO comprises: a second talk group coupling component associated with: a second embedded PTT control component and the second video feed;
    receiving, from the operator via the first talk group coupling component, a first selection of a first talk group to be coupled to the first embedded PTT control component;
    subsequent to the first selection of the first talk group, receiving, from the operator, activation of the first embedded PTT control component; and
    in response to the activation, enabling PTT two-way communications among members of the first talk group and the operator, wherein the first video feed is accessible to members of the first talk group.

2. The method of claim 1, further comprising:
    receiving, from the operator via the first talk group coupling component, a second selection of a second talk group;
    coupling the second talk group to the first embedded PTT control component; and
    enabling PTT two-way communications among members of the second talk group and the operator, wherein the first video feed is accessible to members of the second talk group.

3. The method of claim 1, further comprising:
    enabling data generated by a member of the first talk group to be transmitted to other members of the first talk group, wherein the data generated includes at least one of: a third video feed, a readable file, an audio message, or a text message, and wherein the data generated is displayed or executed by the corresponding IMMO.

4. The method of claim 1, wherein the first talk group is a predetermined talk group having members that are associated with the first video feed based on at least one of a member's information: a talk group membership, an identity, a position, a task, a job title, an agency, a group affiliation, or an access privilege status.

5. The method of claim 1, further comprising:
    granting a member of the first talk group remote directional or zoom control of the first video monitoring camera providing the first video feed, wherein the member of the first talk group is given prioritized control based on at least one of: an attribute of the member including a proximity of the member to the corresponding first video monitoring camera, an identity of the member, a job title of the member, or priority settings associated with the member.

6. The method of claim 1, further comprising:
    displaying the first and the second IMMOs on a map within the VMS GUI; and
    correlating a geolocation of the first video monitoring camera providing the first video feed of the first IMMO with the first IMMO on the map.

7. The method of claim 6, further comprising:
    presenting proximate members of the first talk group on the IMMO, wherein the proximate members are members of the first talk group that satisfy a proximity threshold attribute associated with the first video monitoring camera of the first IMMO.

8. A system for a video management system (VMS) with Push to Talk (PTT) communications, comprising:
    a memory; and
    one or more processors coupled to the memory, and configured to:
    monitor a first video feed from a first video monitoring camera, and a second video feed from a second video monitoring camera, wherein the VMS comprises a first one-to-one communications modality between the first video monitoring camera and a monitoring console of an operator, and a second one-to-one communications modality between the second video monitoring camera and the monitoring console;
    present a VMS graphical user interface (GUI) on the monitoring console, wherein the VMS GUI includes a first interactive multimedia object (IMMO) and a second IMMO, wherein the first IMMO comprises: a first talk group coupling component associated with: a first embedded PTT control component and the first video feed, and wherein the second IMMO comprises: a second talk group coupling component associated with: a second embedded PTT control component and the second video feed;
    receive, via the first talk group coupling component, a first selection of a first talk group to be coupled to the first embedded PTT control component;
    subsequent to the first selection of the first talk group, receive activation of the first embedded PTT control component; and
    in response to the activation, enable PTT two-way communications among members of the first talk group and the operator, wherein the first video feed is accessible to members of the first talk group.

9. The system of claim 8, wherein the one or more processors are further configured to:
    receive, via the first talk group coupling component, a second selection of a second talk group;
    couple the second talk group to the first embedded PTT control component; and
    enable PTT two-way communications among members of the second talk group and the operator, wherein the first video feed is accessible to members of the second talk group.

10. The system of claim 8, wherein the one or more processors are further configured to:
    enable data generated by a member of the first talk group to be transmitted to other members of the first talk group, wherein the data generated includes at least one of: a third video feed, a readable file, an audio message, or a text message, and wherein the data generated is displayed or executed by the corresponding IMMO.

11. The system of claim 8, wherein the first talk group is a predetermined talk group having members that are associated with the first video feed based on at least one of a member's information: a talk group membership, an identity, a position, a task, a job title, an agency, a group affiliation, or an access privilege status.

12. The system of claim 8, wherein the one or more processors are further configured to:
grant a member of the first talk group remote directional or zoom control of the first video monitoring camera providing the first video feed, wherein the member of the first talk group is given prioritized control based on at least one of: an attribute of the member including a proximity of the member to the corresponding first video monitoring camera, an identity of the member, a job title of the member, or priority settings associated with the member.

13. The system of claim 8, wherein the one or more processors are further configured to:
display the first and the second IMMOs on a map within the VMS GUI; and
correlate a geolocation of the first video monitoring camera providing the first video feed of the first IMMO with the first IMMO on the map.

14. The system of claim 13, wherein the one or more processors are further configured to:
present proximate members of the first talk group on the first IMMO, wherein the proximate members are members of the first talk group that satisfy a proximity threshold attribute associated with the first video monitoring camera of the first IMMO.

15. A non-transitory computer-readable medium storing instructions that, when executed by a processor of a first electronic device, cause the processor to perform operations for a video management system (VMS) with Push to Talk (PTT) communications, the operations comprising:
monitoring a first video feed from a first video monitoring camera, and a second video feed from a second video monitoring camera, wherein the VMS comprises a first one-to-one communications modality between the first video monitoring camera and a monitoring console of an operator, and a second one-to-one communications modality between the second video monitoring camera and the monitoring console;
presenting a VMS graphical user interface (GUI) on the monitoring console, wherein the VMS GUI includes a first interactive multimedia object (IMMO) and a second IMMO, wherein the first IMMO comprises: a first talk group coupling component associated with: a first embedded PTT control component and the first video feed, and wherein the second IMMO comprises: a second talk group coupling component associated with: a second embedded PTT control component and the second video feed;
receiving, from the operator via the first talk group coupling component, a first selection of a first talk group to be coupled to the first embedded PTT control component;

subsequent to the first selection of the first talk group, receiving, activation of the first embedded PTT control component; and
in response to the activation, enabling PTT two-way communications among members of the first talk group and the operator, wherein the first video feed is accessible to members of the first talk group.

16. The non-transitory computer-readable medium of claim 15, the operations further comprising:
receiving, from the operator via the first talk group coupling component, a second selection of a second talk group;
coupling the second talk group to the first embedded PTT control component; and
enabling PTT two-way communications among members of the second talk group and the operator, wherein the first video feed is accessible to members of the second talk group.

17. The non-transitory computer-readable medium of claim 15, the operations further comprising:
enabling data generated by a member of the first talk group to be transmitted to other members of the first talk group, wherein the data generated includes at least one of: a third video feed, a readable file, an audio message, or a text message, and wherein the data generated is displayed or executed by the corresponding IMMO.

18. The non-transitory computer-readable medium of claim 15, the operations further comprising:
granting a member of the first talk group remote directional or zoom control of the first video monitoring camera providing the first video feed, wherein the member of the first talk group is given prioritized control based on at least one of: an attribute of the member including a proximity of the member to the corresponding first video monitoring camera, an identity of the member, a job title of the member, or priority settings associated with the member.

19. The non-transitory computer-readable medium of claim 15, the operations further comprising:
displaying the first and the second IMMOs on a map within the VMS GUI; and
correlating a geolocation of the first video monitoring camera providing the first video feed of the first IMMO with the first IMMO on the map.

20. The non-transitory computer-readable medium of claim 19, the operations further comprising:
presenting proximate members of the first talk group on the first IMMO, wherein the proximate members are members of the first talk group that satisfy a proximity threshold attribute associated with the first video monitoring camera of the first IMMO.

21. The method of claim 1, wherein the activation comprises: a touch or a push of the first embedded PTT control component.

* * * * *